United States Patent Office 3,487,860
Patented Jan. 6, 1970

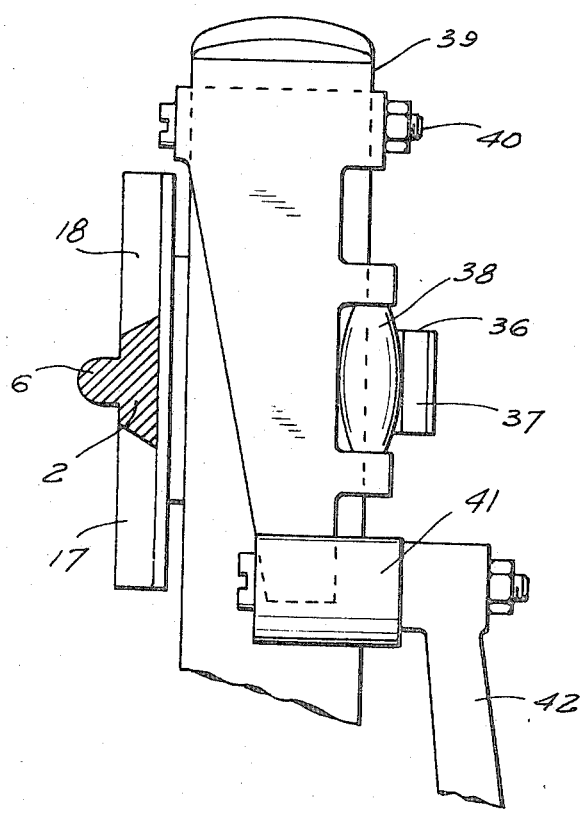

1

3,487,860
SHUTTLE BRAKING ARRANGEMENT
Vladimir Svaty and Jan Bilek, Liberec, Czechoslovakia, assignors to Elitex, Zavody Textilniho Strojirenstvi, Liberec, Czechoslovakia
Filed Jan. 24, 1968, Ser. No. 700,308
Claims priority, application Czechoslovakia, Jan. 26, 1967, 588/67
Int. Cl. D03d 47/00, 49/54, 49/24
U.S. Cl. 139—125                                    10 Claims

ABSTRACT OF THE DISCLOSURE

A shuttle entering the guide way of a turnable shuttle box, is braked by stationary brake means located in the axis of the shuttle box and acting on one side of the shuttle whose other side has oppositely slanted slide faces abutting correspondingly slanted guide faces of the guide way in the shuttle box.

Background of the invention

Looms are known in which gripper shuttles enter turnable shuttle boxes after a pick in one direction, whereupon a shuttle box is turned 180° so that the gripper devices serving the purpose of braking a gripper shuttle, the warp shed. A loom of this type is described in the Czechoslovakian Patent No. 117,355. In such a construction, the gripper shuttle must be completely braked while moving into the comparatively short guide way of the turnable shuttle box, and only a very limited space for the braking mechanism is available. Insufficient braking of the gripper shuttle in the shuttle box would cause serious malfunction during the turning of the shuttle box in the event that the shuttle is not braked to assume a correct position for the next pick.

Summary of the invention

It is the object of the invention to improve braking devices serving the purpose of braking a gripper shuttle, and to provide a braking arrangement which reliably and accurately brakes a gripper shuttle in the guide way of a shuttle box.

Another object of the invention is to brake a gripper shuttle while the same moves a very short distance in a shuttle box.

Another object of the invention is to provide a very small, compact and simple braking device for braking a gripper shuttle having slanted slide faces fitting into a correspondingly shaped guide way of a shuttle box.

With these objects in view, one embodiment of the invention comprises a shuttle box including an elongated guideway having two longitudinal oppositely slanted guide faces on one side and an opening between the guide faces on the other side, a shuttle movable to a position located in the guideway and having on one side two longitudinal oppositely slanted slide faces slidingly abutting the two guide faces of the guideway, and a third slide face located in the opening of the guideway, brake means mounted on the shuttle box being movable between an inoperative position and a braking position in which a brake surface thereof is located in the opening, and operating means for moving the brake means into the braking position so that the surface is pressed against a third slide face. Consequently, the two slanted slide faces of the shuttle are pressed against the two slanted guide faces of the guideway in a wedge-action so that friction is produced for braking the shuttle in the guideway.

The slant of the guide faces of the guideway is the same as the slant of the slide faces of the shuttle, and while the shuttle enters the guideway, the brake surface of the brake means closes the opening of the guideway.

2

In a preferred embodiment of the invention, a stationary holder supports a tubular shuttle box for turning movement about an axis, and the brake means is located along this axis and stationarily mounted so that the tubular shuttle box can be turned relative to the brake means together with the guideway and shuttle in the same. The shuttle box has a tubular part, a flange and two plates adjustably secured to the flange. Each plate has one of the slanted guide faces, and by adjustment of the plates on the flange, the exact width of the guideway, and the spacing of the guide faces of the same can be adapted to the width of the shuttle.

The brake means includes a bolt and a brake member having the brake surface. The bolt is adjustably attached to a releasing lever mounted on the holder. A spring urges the brake member into the braking position, but when the lever is operated by an actuating means controlled from the loom, the brake surface is retracted from the shuttle to release the same for the next pick.

In the construction of the invention, three surfaces effect the braking of the shuttle in the shuttle box. Two of the surfaces are slanted and adjustable relative to each other, and the third surface is provided on the brake member which is biassed by the brake spring.

It is advantageous to construct the brake member and its braking surface, and the two plates whose slanted edges form the guideway, of a non-metallic braking material for obtaining a high coefficient of friction and a noiseless braking operation.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 1a is a side elevation of the brake arrangement of FIG. 1;

Description of the preferred embodiment

Figure 1:
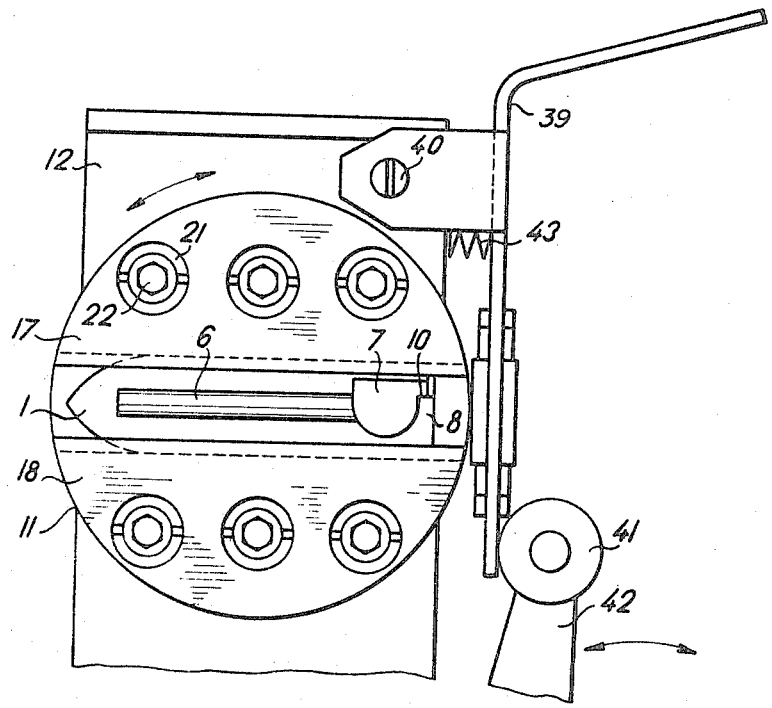
FIG. 1 is a schematic front elevation illustrating a braking arrangement according to the present invention provided in a rotary shuttle box.

A gripper shuttle 1 has a body 2 with a cavity 9 and has a slanted first slide face 3, and an oppositely slanted second slide face 4 on one side. On the other side, shuttle 1 has a wall with a third slide face 5. A profiled projection 6 is located between the two slanted slide faces 3 and 4. The leading end of the shuttle body 2 is pointed, and the trailing end has a recess 7, a finger 8, and a flat spring 10 for clamping a weft thread which is inserted into the warp shed during the pick of the shuttle. On both sides of the loom, a holder 12 with a turnable shuttle box 11 is mounted so that a shuttle picked to the left as viewed in FIG. 1, passes through the warp shed, enters the shuttle box on the other side of the loom, not shown, and is then picked in the opposite direction back into the shuttle box shown in FIG. 1.

Figure 2:
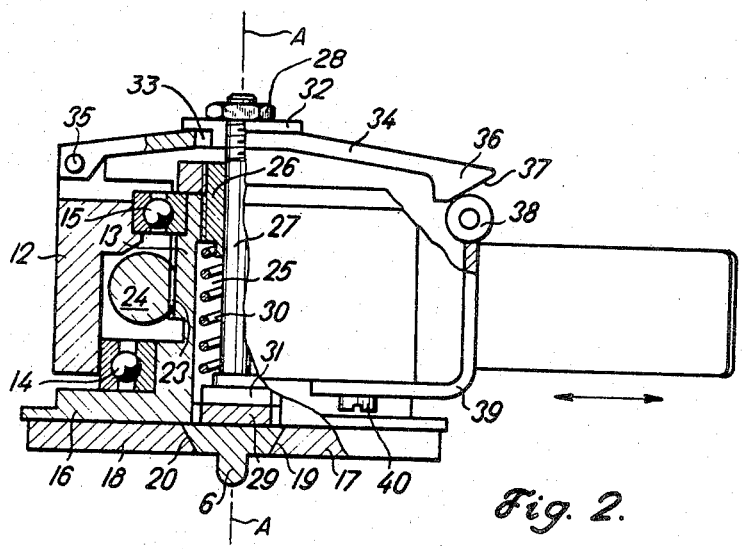
FIG. 2 is a plan view, partially in section, of the arrangement of FIG. 1, the shuttle box being shown in a position turned 90° as compared with the position in FIG. 1.

As best seen in FIG. 2, the shuttle box comprises a hollow tubular portion 13 which is mounted in bearings 14 and 15 in a holder 12. A flange 16 projects outwardly from the tubular portion 13 and carries two semicircular plate segments 17 and 18 which have guide faces 19 and 20 slanted in opposite direction and together forming a guideway for the shuttle 1. The slide faces 3 and 4 of the shuttle are inclined the same angle as the guide faces 19 and 20 so that the shuttle fits into the guideway when the distance between plates 17 and 18 is adjusted to the precise dimensions of shuttle 1. Screws 22, see FIGS. 1 and 3, secure plates 17 and 18 to flange 16, and pass through eccentric circular members 21 by which the position of plates 17 and 18 can be adjusted to the shuttle.

The tubular portion 13 of the rotary shuttle box 11 has a gear rim 23 meshing with a rack bar 24 so that longitudinal movement of the rack bar causes turning of the rotary shuttle box 13, 16, 17, 18 about the axis A of the tubular portion 13. Consequently, a shuttle entering guideways 19, 20 after a pick in one direction has its leading end pointing away from the warp shed until the rotary shuttle box 11 is turned 180° together with the shuttle so that the pointed end of the same points again toward the warp shed. This arrangement is not an object of the present invention.

A bearing sleeve 26 is located in the interior 25 of the tubular portion 13 screwed into a threaded bore of the same and turns with the shuttle box. A bolt 27 is mounted in the inner cylindrical surface of sleeve 26 for axial movement, and permits turning of shuttle box 11 with bearing sleeve 26 although bolt 27 is stationary and non-turnable.

Bolt 27 has a threaded end portion passing through a cutout 33 in the releasing lever 34 which is mounted on a pivot 35 carried by the stationary holder 12 in which the shuttle box 11 is mounted for turning movement. A flanged washer 32 is located between nut 28 and the releasing lever 34 in cutout 33. The other end of the bolt 27 carries a brake member 31 with a brake lining 29 having a brake surface abutting slide face 5 of the shuttle under the action of a spring 30 on the bolt 27 and abutting bearing sleeve 26 and a shoulder on brake member 31. The pressure of the spring urges brake lining 29 with its brake surface against surface 5 of the shuttle. The brake pressure produced by spring 30 is adjusted by turning nut 28 on the threaded end of bolt 27.

When releasing lever 34 is turned in counterclockwise direction about pivot 35, the brake means 27, 31, 29 is retracted and moved out of the braking position shown in FIG. 2 to an inoperative position slightly spaced from the opposite surface 5 of the shuttle.

Releasing lever 34 has an end portion 36 with a slanted face 37 against which a roller 38 abuts. Roller 38 is mounted for rotation on a double-armed lever 39 which is turnable about a pivot screw 40 secured to the stationary holder 12, as shown in FIGS. 1 and 2. Lever 39 has a transversely projecting handle portion 39a at one end, and is engaged at the other end by a roller 41 of an oscillatory lever 42. When lever 42 moves to the left as viewed in FIG. 1, lever 39 is turned in clockwise direction against the action of a spring 43 abutting lever 39 and holder 12. Downward pressure on the handle portion 39a has the same effect.

When lever 39 is turned in clockwise direction, roller 38 presses against the slanted end face 37 of end portion 36 of releasing lever 34 and causes turning of lever 34 in counterclockwise direction as viewed in FIG. 2 for retracting the brake means 27, 31, 29 against the action of spring 30 to an inoperative position. Actuator lever 42 is controlled by the loom mechanism to release the braking means in synchronism with the picking and other operations of the loom.

Plates 17 and 18, and brake lining 29 may consist of a non-metallic synthetic material for increasing the friction, or guide faces 19 and 20 may be lined by a suitable brake lining.

The angle α at which the slide faces 3 and 4 of shuttle 1, and the guide faces 19 and 20 of the guideway are inclined, is preferably within the range between 20° and 30°.

Operation

The gripper shuttle 1 which is picked through the warp shed and grips a weft thread, arrives at the shuttle box 11 and enters the guideway formed by guide faces 19, 20 and the braking surface of brake jaw 29 which is pressed by spring 30 into the guideway, so that the shuttle is rapidly and totally braked due to the fact that it is urged into engagement with the slanted guide faces 19 and 20 which also act as brake surfaces.

Figure 4:
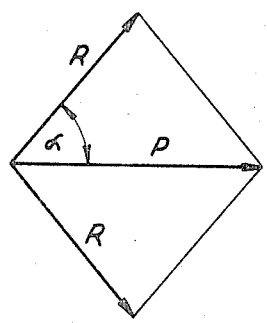
FIG. 4 is a vector diagram illustrating the braking forces.
Figure 3:
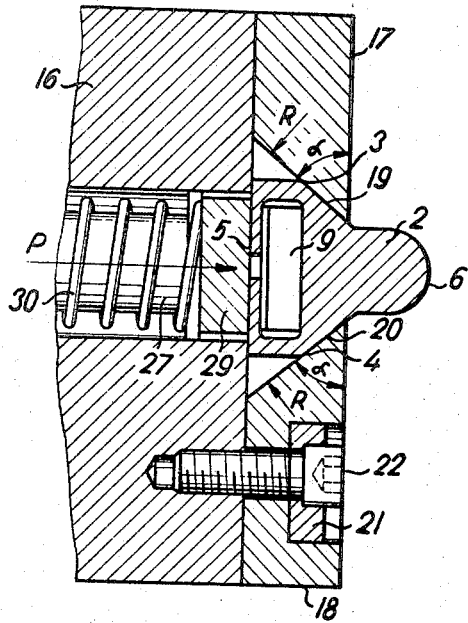
FIG. 3 is a fragmentary vertical sectional view of the arrangement of FIG. 1, shown on a larger scale.

Referring to FIGS. 3 and 4, the braking force P exerted by the brake means 27, 31, 29 due to the action of spring 30, is resisted by two reaction forces R on guide faces 19 and 20. The magnitude of the resistance forces R depends on the magnitude of the angle α. Assuming the same friction coefficient $f$ for all three pairs of abutting faces, the friction force on slide face 5 is $T_1 = Pf$.

The friction force acting on each of slide faces 3 and 4 of the shuttle is $T_2 = Rf$. Since $$R = \frac{1}{2 \cos \alpha}$$

and the friction forces acting in longitudinal direction of the shuttle can be added in accordance with the equation $T = T_1 + 2T_2$, it follows that the total frictional resistance encountered by the shuttle is $$T = Pf\left(1 + \frac{1}{\cos \alpha}\right)$$

The above analysis proves that braking of the gripper shuttle along three surfaces, two of which are slanted, produces a higher resultant braking force than could be produced by braking between two parallel braking surfaces, assuming the same spring force. A high friction coefficient is obtained when the effective braking surfaces 29, 19 and 20 are made of a suitable synthetic material which also reduces the noise of the operation.

After the gripper shuttle 1 has been braked and brought to a stop, actuating means 42, 41 is turned in counterclockwise direction as viewed in FIG. 1 to turn actuating lever 39 in clockwise direction against the action of spring 43. Roller 38 engages the slanted face 37 and turns releasing lever 34 in counterclockwise direction as viewed in FIG. 2 so that brake means 27, 31, 29 is urged to move against the action of spring 30 away from the shuttle whereby the braking force exerted by the braking jaw and its surface 29 is reduced or terminated.

Upon reduction of the brake pressure, the gripper shuttle 1 is moved to a position in which a weft yarn is inserted into the shuttle in a known manner, as for example, described in the Czechoslovakian Patent No. 119,126, and other publications.

After the weft yarn has been fed into the gripper 8, 10 of shuttle 1, actuating lever 42 with roller 41 is moved to the right back to the initial position shown in FIG. 1 so that spring 43 turns actuating lever 39 in counterclockwise direction, and releasing lever 34 can return to the position shown in FIG. 2 in which spring 30 is effective to press the braking surface 29 of the brake means 27, 31, 29 against the shuttle so that the same is clamped in the guideway 19, 20 formed by plates 17 and 18 of the turnable shuttle box 11. Rack bar 24 is now shifted from the drive means of the loom so that gear portion 23 of the tubular portion 13 of the shuttle box is turned with the same and plate means 18, 19 while the brake means, lever 34, and holder 12 remain stationary. The manner in which shuttle box 11 is turned by the rack bar 24 is known and, for example, described in the Czechoslovakian Patents Nos. 117,355 and 120,160.

After the shuttle box with the guide way and the shuttle has been turned 180° so that the pointed end of the shuttle points toward the warp shed, actuating means 42 is again operated to turn releasing lever 34 in counterclockwise direction as viewed in FIG. 2 so that the shuttle is no longer clamped and can be picked through the warp shed with the pointed end of the shuttle leading.

When the handle portion 39a of lever 39 is manually operated to turn lever 39 in clockwise direction as viewed in FIG. 1, releasing lever 34 is operated to retract the brake means 28, 32, 27, 31, 29 against the action of spring 30 so that the shuttle is no longer clamped and can be manually removed from the guideway 19, 20, or a shuttle may be placed in an empty guideway.

The picked shuttle enters a device, as shown in FIGS. 1–3, located on the other side of the warp shed, and is first braked in the same and then turned as described above to be picked back into the illustrated device.

It will be understood that each of the elements described above, or two or more together, may also find a useful application in other types of shuttle braking arrangements differing from the types described above.

While the invention has been illustrated and described as embodied in a braking arrangement for braking and clamping a gripper shuttle in a trapezoid guideway in a turnable shuttle box, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims.

1. Shuttle braking arrangement comprising, in combination, a hollow shuttle box including an elongated guideway having two longitudinal oppositely slanted guide faces on one side and an opening between said guide faces on the other side; a holder for mounting said shuttle box for turning movement about an axis; a shuttle movable to a position located in said guideway and having on said one side two longitudinal oppositely slanted slide faces slidingly abutting said two guide faces in said position, and on said other side a third slide face located in said opening; brake means located on said other side of said guideway in said hollow shuttle box and having a brake surface located opposite said opening; mounting means mounting said brake means concentric with said axis for movement in axial direction between an inoperative position, and a braking position in which said brake surface is located in said opening; means for holding said brake means non-turnable about said axis so that said brake surface remains opposite said third slide face when said shuttle box with said shuttle in said guideway is turned in said holder relative to said brake means; and operating means including biassing means in said shuttle box for urging said brake means into said braking position so that said brake surface is pressed against said third slide face, and said two slanted slide faces of said shuttle are pressed against said two slanted guide faces of said shuttle box whereby friction is produced for braking said shuttle in said guideway.

2. Shuttle braking arrangement as claimed in claim 1 wherein said biassing means include spring means.

3. Shuttle braking arrangement as claimed in claim 2 wherein said shuttle box includes a tubular part surrounding said brake means, a flange secured to said tubular part, and two plates abutting said flange, each plate having one of said two guide faces so that said plates form said guideway; and attaching means for securing said plates to said flange and being adjustable for adjusting the distance between said two guide faces.

4. Shuttle braking arrangement as claimed in claim 3 wherein said operating means include a releasing lever pivotally mounted on said holder and connected with said brake means for moving the same against the action of said spring means to said inoperative position.

5. Shuttle braking arrangement as claimed in claim 1 wherein said operating means comprise releasing means for moving said brake means from said braking position to said inoperative position against the action of said biassing means; and comprising actuating means for said releasing means.

6. Shuttle braking arrangement as claimed in claim 5 wherein said brake means includes a brake member having said brake surface, and a connecting bolt connecting said brake member with said releasing means; and wherein said biassing means includes a spring means surrounding said connecting bolt abutting the same and said shuttle box for urging said brake member into said braking position.

7. Shuttle braking arrangement as claimed in claim 6 wherein said releasing means includes a releasing lever pivotally mounted on said holder and having a cutout; wherein said bolt passes through said cutout and has a threaded end portion; and nut means on said threaded end portion adjustable on the same for adjusting said bolt and said spring means.

8. Shuttle braking arrangement as claimed in claim 6 wherein said holder for said shuttle box has bearing means for mounting said shuttle box with said guideway and said shuttle box in the same for turning movement about said axis; and wherein said shuttle box has a bearing sleeve with an inner cylindrical bearing surface turnably sliding on the outer surface of said bolt during rotation of said shuttle box, said bolt having an axis coinciding wth said axis.

9. Shuttle braking arrangement as claimed in claim 8 wherein said shuttle box has a tubular portion surrounding said bearing sleeve and said bolt, a flange portion at one end of said tubular portion, and a guide plate means secured to said flange portion and having said guideway with said two guide faces and said opening on the side thereof facing said one end of said tubular portion; and wherein said brake member and said brake surface are circular so that said shuttle box with said guideway can be turned about said bolt and said brake member while the same clamps said shuttle in said guideway.

10. Shuttle braking arrangement as claimed in claim 9 wherein said guide plate means includes two plates having said two guide faces, respectively, and eccentric attaching means for adjustably attaching said two plates to said flange portion so that the spacing of said two guide faces matches the spacing of said two slide faces of said shuttle.

References Cited

UNITED STATES PATENTS

| 453,467 | 6/1891 | Elles et al. | 139—184 |
| 2,271,205 | 1/1942 | Pfarrwaller | 139—187 X |
| 2,693,831 | 11/1954 | Turner | 139—186 |
| 2,713,357 | 7/1955 | Peterson | 139—186 |
| 2,777,471 | 1/1957 | Peterson | 139—125 |
| 3,124,166 | 3/1964 | Pfarrwaller | 139—126 |
| 3,315,709 | 4/1967 | Svaty | 139—125 |
| 3,322,161 | 5/1967 | Evans et al. | 139—187 |

FOREIGN PATENTS

| 677,255 | 6/1939 | Germany. |
| 814,875 | 9/1951 | Germany. |

JAMES KEE CHI, Primary Examiner

U.S. Cl. X.R.

139—185